(12) United States Patent
Jeon

(10) Patent No.: US 6,202,011 B1
(45) Date of Patent: Mar. 13, 2001

(54) ELECTRONIC CONTROLLED SUSPENSION SYSTEM USING WHEEL SPEED

(75) Inventor: Yong Won Jeon, Kyounggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/392,286

(22) Filed: Sep. 8, 1999

(30) Foreign Application Priority Data

Sep. 9, 1998 (KR) .................................................. 98-37213

(51) Int. Cl.$^7$ .................................................. B60G 23/00
(52) U.S. Cl. ........................ 701/37; 280/5.515; 280/5.519
(58) Field of Search .................. 701/1, 37, 38; 280/5.507, 5.508, 5.512, 5.515, 5.519

(56) References Cited

U.S. PATENT DOCUMENTS

| | | | |
|---|---|---|---|
| 4,651,290 | * 3/1987 | Masaki et al. | 280/5.514 |
| 5,088,762 | * 2/1992 | Fukuyama et al. | 280/707 |
| 5,163,704 | * 11/1992 | Wada | 280/5.503 |
| 5,204,815 | * 4/1993 | Yamamoto | 701/38 |
| 5,444,621 | * 8/1995 | Matsunaga et al. | 701/37 |
| 5,638,275 | * 6/1997 | Sasaki et al. | 701/38 |
| 5,809,437 | * 9/1998 | Breed | 701/29 |
| 5,897,130 | * 4/1999 | Majeed et al. | 188/282.1 |
| 5,968,105 | * 10/1999 | Burkhard et al. | 701/70 |

\* cited by examiner

Primary Examiner—William A. Cuchlinski, Jr.
Assistant Examiner—Eric M. Gibson

(57) ABSTRACT

The present invention relates to an electronic suspension control system (ECS) not using a G sensor and a steering angle sensor but using an ECS control algorithm and an ABS wheel speed sensor in order to perform rough road detecting and roll controlling. The ECS includes a wheel speed sensor for measuring the front and rear wheel speed; a throttle position sensor (TPS) for sensing the open status of the throttle valve; a stop lamp switch for sensing the braking status; an inhibitor switch for sensing the position of the automatic transmission; a rough road detecting algorithm wherein the data obtained from the each said element are inputted to the control unit, and the rough road detecting part of the said control unit decides the condition of the road surface by performing FFT of the inputted data, multiplying the established frequency gain, integrating and adding, when the front left wheel speed is below 40 KPH; and an anti-roll control algorithm wherein the transverse acceleration calculated using the left and right wheel speed difference is numerically differentiated, and the damping force becomes hard if the said transverse acceleration differentiation value is larger than the transverse acceleration differentiation threshold value, when the front left wheel speed is over 40 KPH.

3 Claims, 18 Drawing Sheets

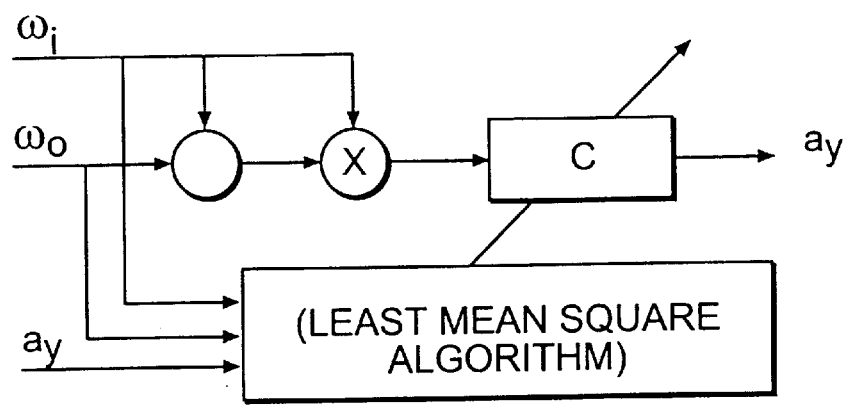
FIG. 18
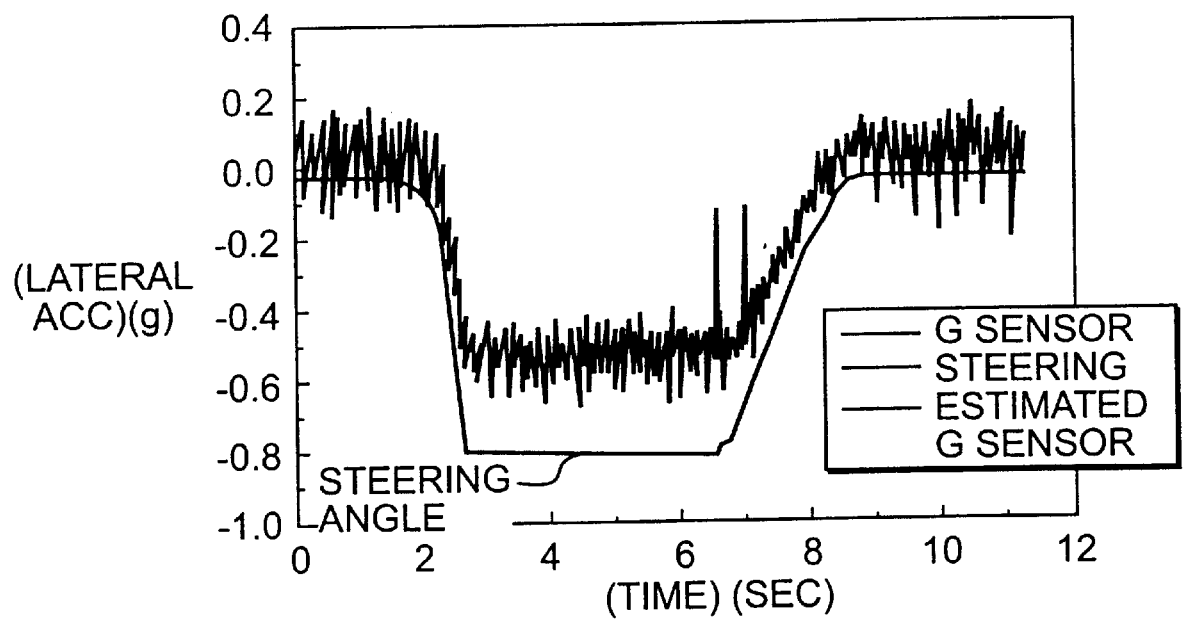

ELECTRONIC CONTROLLED SUSPENSION SYSTEM USING WHEEL SPEED

BACKGROUND OF THE INVENTION

1. Field of the Invention

The present invention relates to an electronic controlled suspension system using wheel speed thereinafter an ECS control system. More specifically the present invention relates to an ECS control system not using a G sensor and a steering angle sensor but using a control algorithm and an antilock brake system (ABS) wheel speed sensor in order to perform rough road detecting and roll control.

2. Detailed Description of the Related Arts

One example of known semi-active type suspension systems is an ECS system (10) as shown in FIG. 1, which controls the damping force of the shock absorber by the input of the G sensor (12), steering angle sensor (14), vehicle speed sensor (16), inhibitor switch (17), throttle position sensor (TPS) (18) and stop lamp switch (19). Data obtained from the G sensor (12), steering angle sensor (14), vehicle speed sensor (16), inhibitor switch (17), throttle position sensor (18) and stop lamp switch (19) are inputted, respectively, to the rough road detecting part (22), anti-roll detecting part (24), wheel speed response part (26), anti-shift detecting part (27), anti-squat detecting part (28) and anti-dive detecting part (29) of the ECS system (10).

Heretofore most of the semi-active type suspension systems were of a 2-step or 3-step damping force control type, but nowadays, the use of the continuously variable type damper is increasing.

Although the continuously variable type damper can improve ride comfort by using sky-hook control etc., it has a problem that it makes a system complicated and raises price due to the increased sensors. Also, the semi-active type suspension system has a defect that riders do not feel comfort when driving.

The conventional analysis of the signals from the wheel speed sensor indicates that the peak frequency of the frequency response of the pitch rate is identical with the wave-type peak frequency of the wheel speed sensor below 5 Hz, as shown in FIG. 2.

Meanwhile, improving the ride comfort means reducing the vibration of a vehicle, as shown in FIG. 3. For this purpose, it is necessary to make the damping force hard in low frequency including the resonance frequency of the body of a vehicle, and make the damping force soft in high frequency. Therefore, the main factor of improving the ride comfort is detecting the vibration of the body of a vehicle in the low frequency range.

A pitching develops between the wheel speed and the movement of a vehicle according to the road condition when the vehicle is driving at a constant speed V, as shown in FIG. 2. At this moment, the wheel speed sensor rotates according to the change of pitching. Therefore, the signal of the wheel speed changes with pitching.

Namely, the wheel angular velocity becomes $\theta_v + \theta_p$, or the wheel angular velocity is expressed by the following equation:

$$V_p = K(\theta v + \theta p)$$

, wherein
K: constant
$\theta_v$: angular velocity when the vehicle speed is V
$\theta_p$: angular velocity due to the pitching The ride comfort is improved by detecting the movement of a vehicle and changing the damping force by use of the wheel speed sensor, based on the above equation. FIG. 4 is a block diagram of the conventional ECS control system, in which the data measured by the wheel speed sensor is inputted to the suspension electronic control unit (ECU) (50) via antilock brake system (ABS) ECU (41). And a frequency sensing circuit (52) is mounted inside the suspension ECU (50). Also, several damping force actuators (43, 45, 47 & 49) and shock absorbers (42, 44, 46 & 48) are connected to the suspension ECU.

Meanwhile, FIG. 5 represents the result of the ride comfort control effect of the real-vehicle test, which shows that the vibration decreases around the resonance point of the vehicle body.

As mentioned above, in spite of the mounting of ABS, the conventional semi-active type suspension system has the disadvantage in that the ECS system is complicated due to the use of additional G sensors, steering angle sensors, wheel speed sensors, etc., and the cost is high due to the sensors performing the same functions.

SUMMARY OF THE INVENTION

An object of the present invention is to provide an ECS control system using wheel speed which simplifies the system by not using G sensors, steering angle sensors, etc.

Another object of the present invention is to provide an ECS control system using wheel speed which is able to perform the intended control in an ABS-mounted vehicle with an algorithm using the wheel speed sensor, and its using method.

The ECS control system using wheel speed to accomplish the above objects comprises:
 a) a wheel speed sensor (36) measuring the wheel speed of the front and rear wheels;
 b) a throttle position sensor (TPS) (38) sensing the open status of the throttle valve;
 c) a stop lamp switch (39) sensing the braking status;
 d) an inhibitor switch (37) sensing the position of the automatic transmission, and
 e) an FFT (fast Fourier transform) integration algorithm wherein the data obtained from the each said element are inputted to the control unit (40), and the rough road detecting part (42) of the said control unit (40) decides the condition of the road surface by multiplying the frequency gain by the use of FFT, integrating and adding.

The ECS control system using wheel speed to accomplish the above objects comprises:
 a) a wheel speed sensor (36) measuring the wheel speed of the front and rear wheels;
 b) a throttle position sensor (TPS) (38) sensing the open status of the throttle valve;
 c) a stop lamp switch (39) sensing the braking status;
 d) an inhibitor switch (37) sensing the position of the automatic transmission; and
 e) an anti-roll control algorithm wherein the data obtained from the each said element are inputted to the control unit (40), and the rough road detecting part of the said control unit (40) decides the condition of the road surface by multiplying the frequency gain by the use of FFT, integrating and adding.

BRIEF DESCRIPTION OF THE DRAWINGS

FIG. 18 is a block diagram which outlines the transverse acceleration calculation method.

FIG. 19 is a graph which represents the calculation results of the transverse acceleration for right turning.

Figure 1:
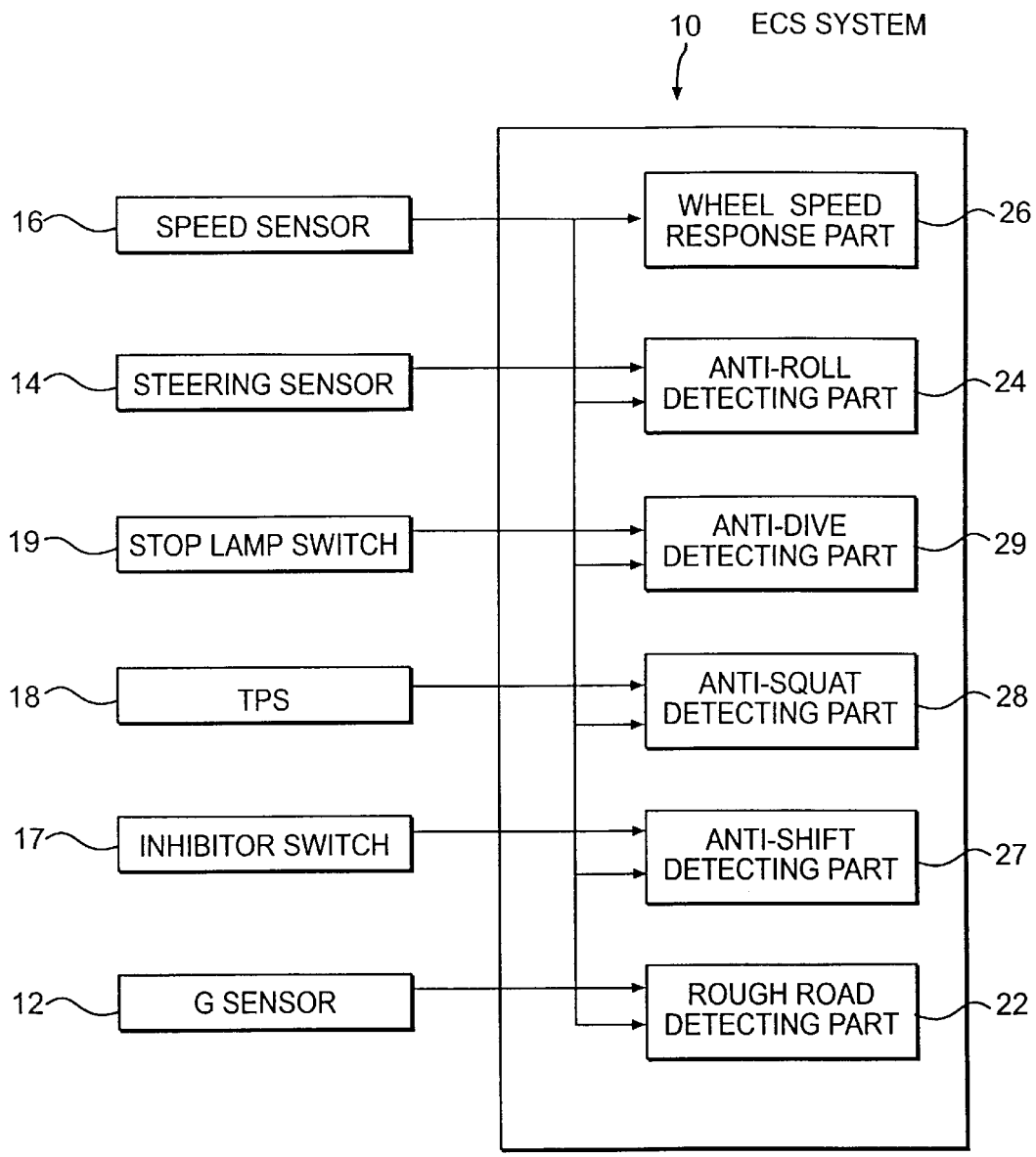
FIG. 1 is a block diagram which outlines a conventional ECS system.
Figure 2:
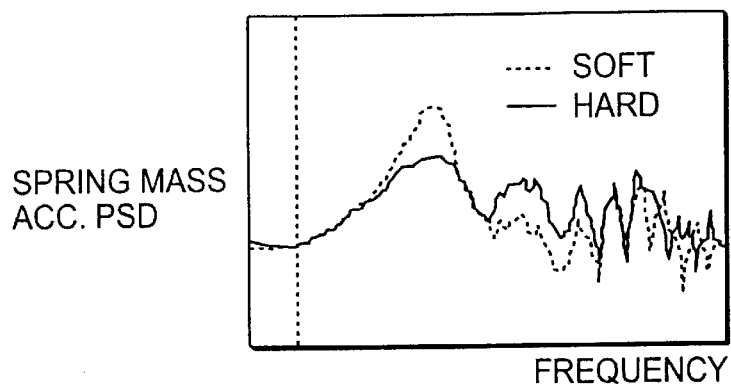
FIG. 2 is a graph which represents the relationship between the damping force of the damper and ride comfort.
Figure 3:
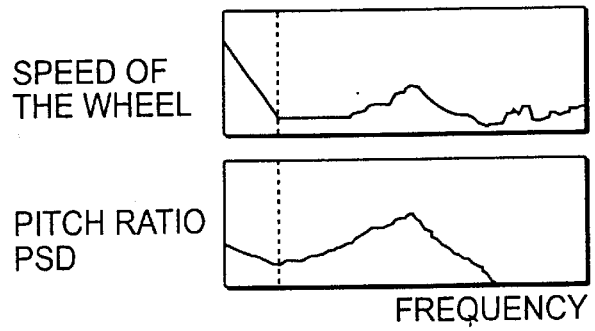
FIG. 3 is a graph which represents the speed of the wheels and FFT results of the pitch ratio.
Figure 4:
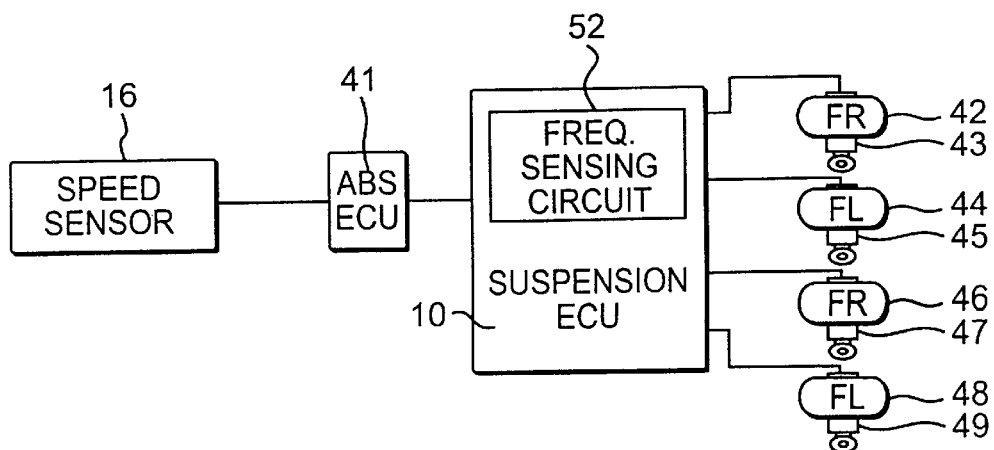
FIG. 4 is a drawing which represents the connection of the ABS ECU and the suspension ECU in a conventional ECU system.
Figure 5:
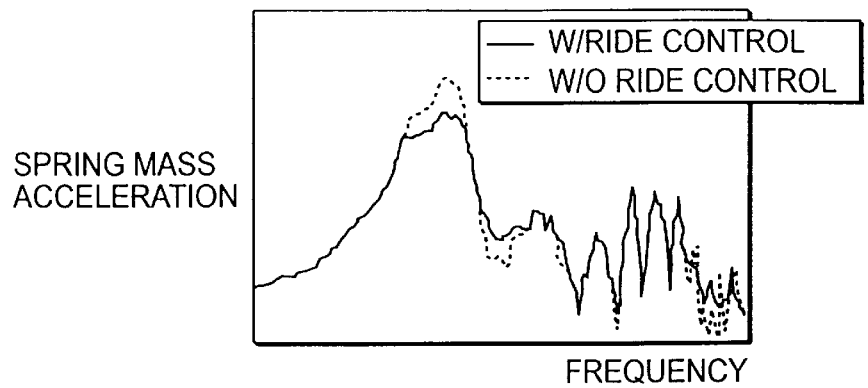
FIG. 5 is a graph which represents the comfort ride control effect.

Description of symbols of key parts in the drawings

| 10,50: ECS systems | 12: G sensor |
| 14: steering angle sensor | 16: vehicle speed sensor |
| 17,37: inhibitor switches | 18,38: throttle position sensors |
| 19,39: stop lamp switches | 22,42: rough road detecting parts |
| 24,44: anti-roll detecting parts | 26,46: vehicle speed responding parts |
| 27,47: anti-shift detecting parts | 28,48: anti-square detecting parts |
| 29,49: anti-dive detecting parts | 36: wheel speed sensor |
| 40: control unit | 50: suspension ECU |
| 52: frequency detecting circuit | 70: FFT |

DETAILED DESCRIPTION OF THE INVENTION

The ECS system using wheel speed is explained in detail referring to the attached drawings with an example as follows.

Figure 6:
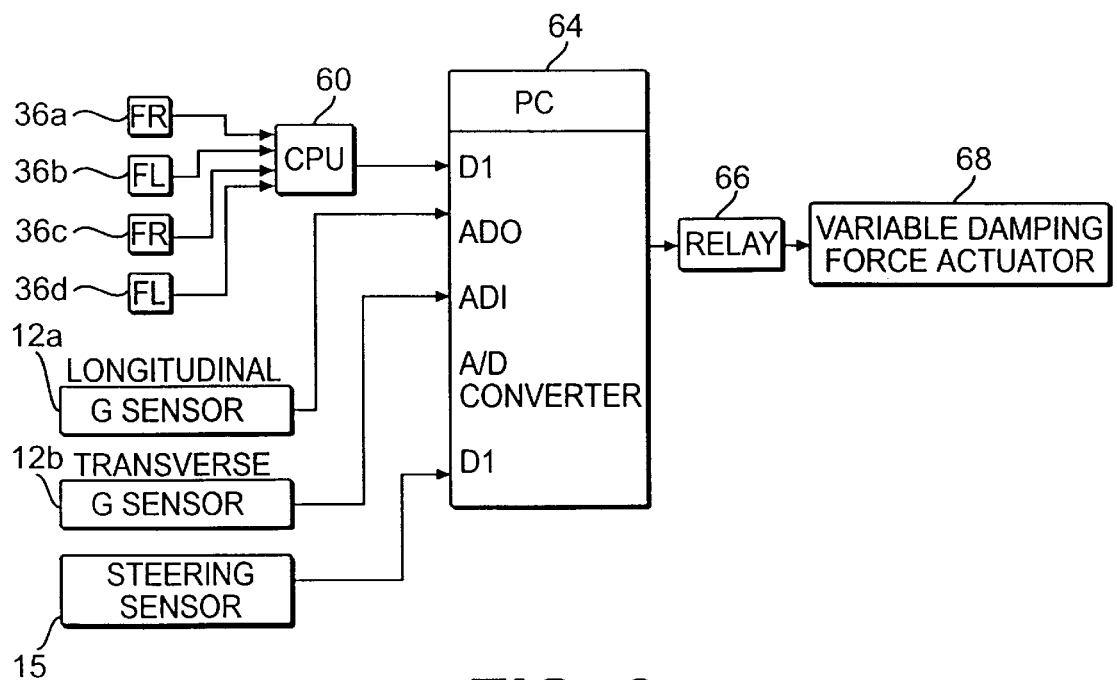
FIG. 6 is a block diagram which represents the data detecting status of a conventional ECS system.

FIG. 6 is a block diagram representing the data-detecting status of the real vehicle test of the conventional ECS control system.

The data obtained from several wheel speed sensors (36a, 36b, 36c & 36d) are inputted to the central processor unit (60) in order to measure the period of wheel speed pulse. The said wheel speed is supplied from the ABS suspension ECU, and the central processor unit (60) is connected to the A/D converter (64).

The said A/D converter (64) receives the data measured from the longitudinal G sensor (12a), the transverse G sensor (12b) and the steering sensor (15). The said A/D converter (64) converts the analogue value to digital value by the said unit (60).

The data inputted to the said A/D converter (64) are calculated in the central processor unit (60) by using a pertinent algorithm and the relay (66) is actuated through the out port (not specified in the figure) of the A/D converter (64).

And, the said relay (66) controls the damping force by actuating the variable damping force actuator (68).

In the present invention, the relationships among the longitudinal and the transverse G sensors (12a & 12b), the steering sensor (15) and the wheel speed sensors (36a, 36b, 36c & 36d) were recognized through the said real vehicle test.

Figure 7:
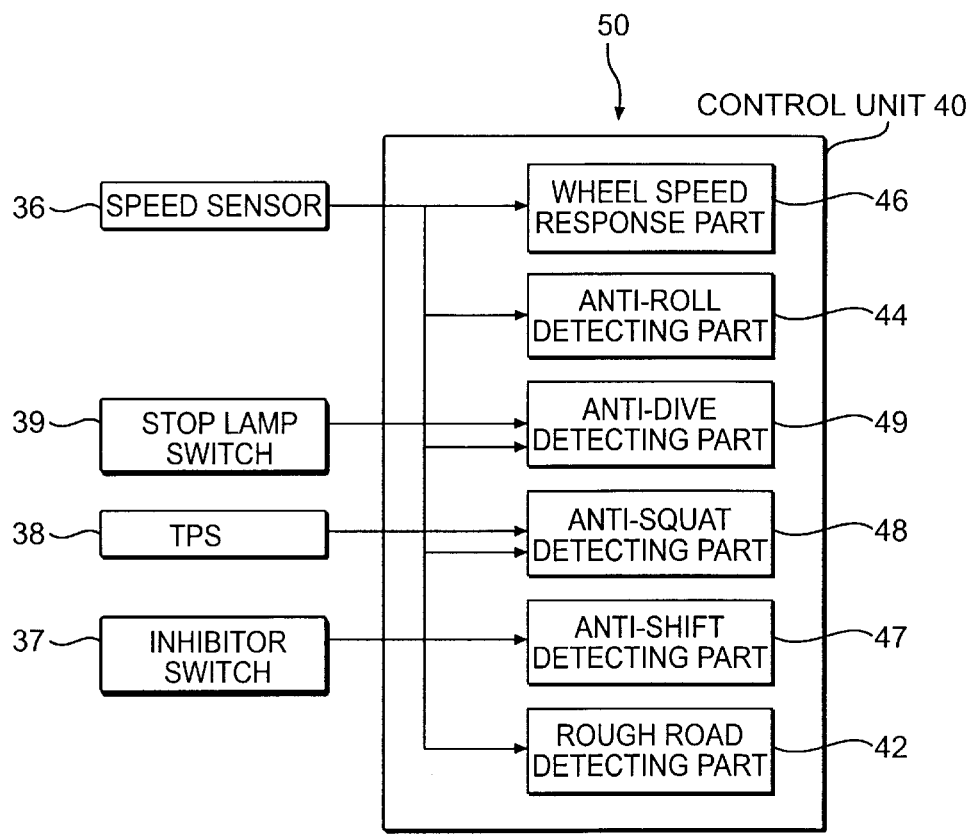
FIG. 7 is a block diagram of the ECS system according to an example of the present invention.
Figure 8:
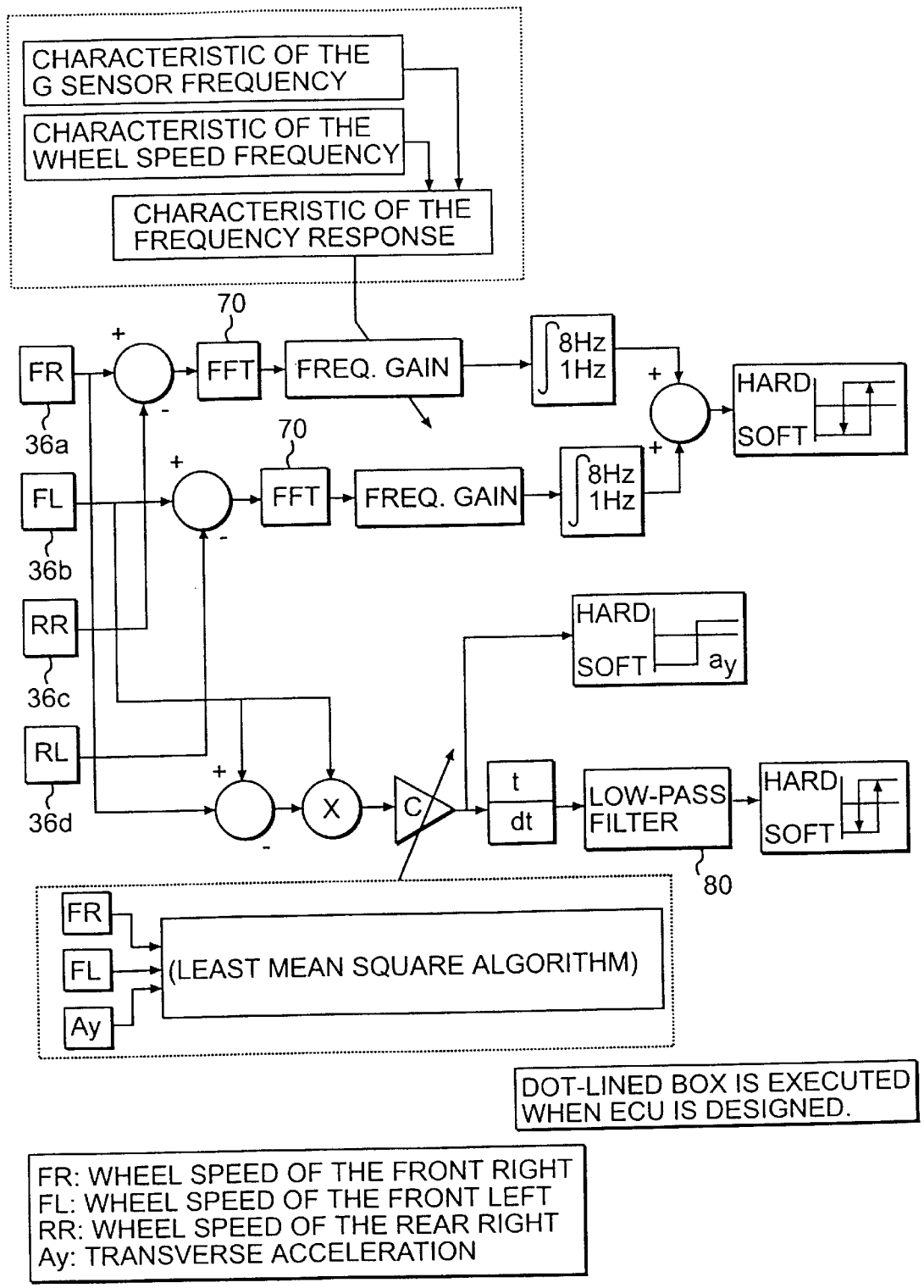
FIG. 8 is a detailed block diagram of the ECS system applied to the present invention.

FIG. 7 is an ECS block diagram applied to the ECS control system using the wheel speed for the example of the present invention, and FIG. 8 is a block diagram which represents the operational relationship of the ECS system using the wheel speed of the present invention.

The data inputted to the control unit (40) applied to the ECS system of the present invention are inputted respectively from the wheel speed sensor (46), the inhibitor switch (37), the throttle position sensor (38) and the stop lamp switch (39), to the wheel speed responding part (42), rough road detecting part (42), anti-roll detecting part (44), anti-shift detecting part (47), anti-squat detecting part (48) and anti-dive detecting part (49) of the control unit (40), as shown in FIG. 7.

As the difference of front and rear wheel speed and the G sensor (12) value have similar frequency characteristics, the data obtained from driving the roads were inputted to FFT (70) and the frequency was analyzed.

To obtain the G sensor (12) value from the difference of the front and rear wheel speed, the FFT (70) value of the G sensor (12a, 12b) was divided by the FFT (70) value of the difference of the front and rear wheel speed.

As a result, the frequency gain between the two data was obtained, and using this result, the frequency characteristics of the G sensor (12) value can be obtained from the difference of the front and rear wheel speed.

As the data with the said frequency gain over 20 Hz are useless, the frequency characteristics of the low-pass filter (80) with the cut-off frequency of 20 Hz and 4 poles was multiplied by the frequency gain. The transfer function of the said low-pass filter (80) is expressed as the following equation:

$$H_l = \frac{0.0466 + 0.1863z^{-1} + 0.2795z^{-2} + 0.1863z^{-3} + 0.0466z^{-4}}{1 - 0.7821z^{-1} + 0.68z^{-2} - 0.1827z^{-3} + 0.0301z^{-4}}$$

Due to the riding characteristics of a vehicle, the excitation frequency resonance occurs at 1 Hz for sprung mass, and around 10 Hz for unsprung mass. Around 1 Hz, the one with large damping force (hard) is advantageous, and for the frequencies 10 Hz, the one with small damping force (soft) is better.

Accordingly, if it is possible to infer the vibrational frequency component of a vehicle from the vehicle speed data, the ride comfort may be improved by varying the damping force.

Also, the condition of the running road can be decided from the magnitude of the frequency component.

Figure 10:
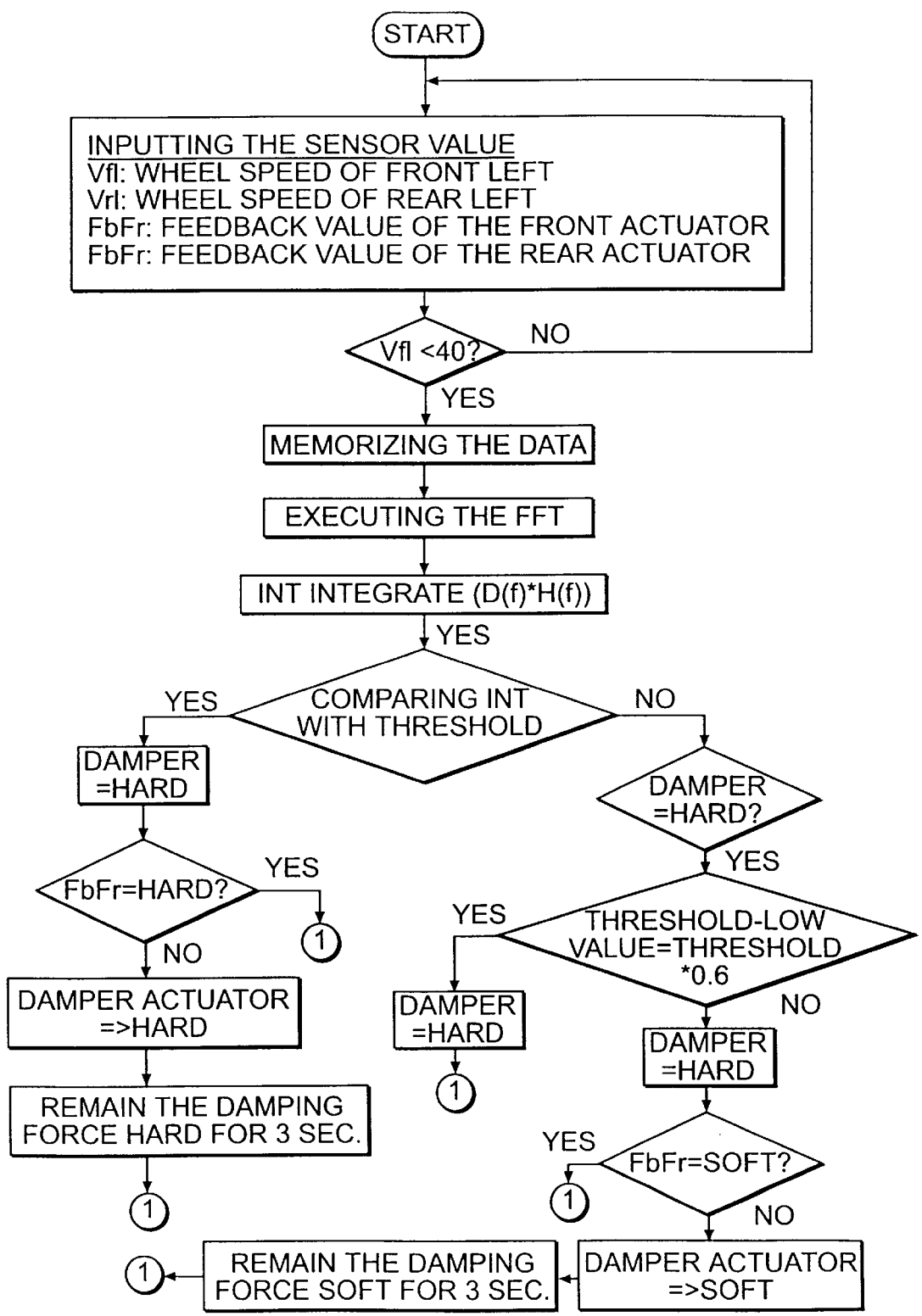
FIG. 10 is a flowchart which represents the rough road detecting method.
Figure 11:
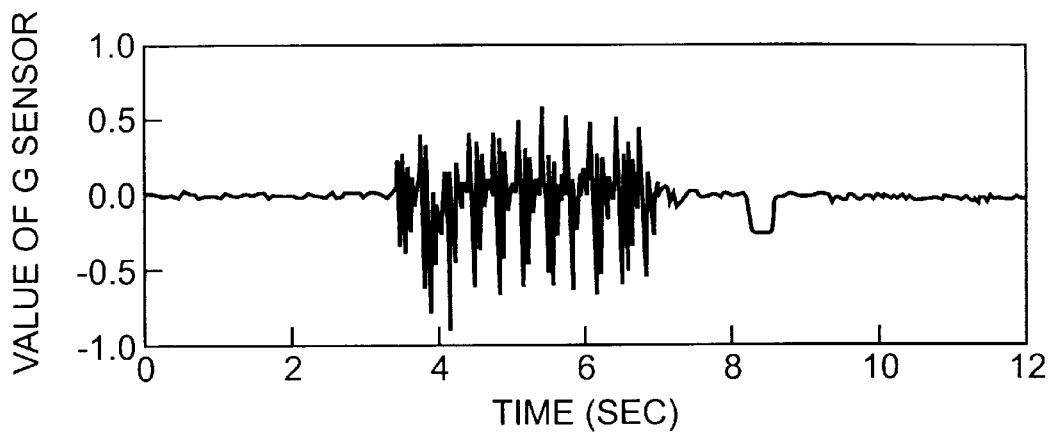
FIG. 11a–FIG. 11d are graphs which represent the real-vehicle test results of the G sensor, speed difference of the vehicles, FFT integration value and actuator when driving on the rough road.
Figure 11:
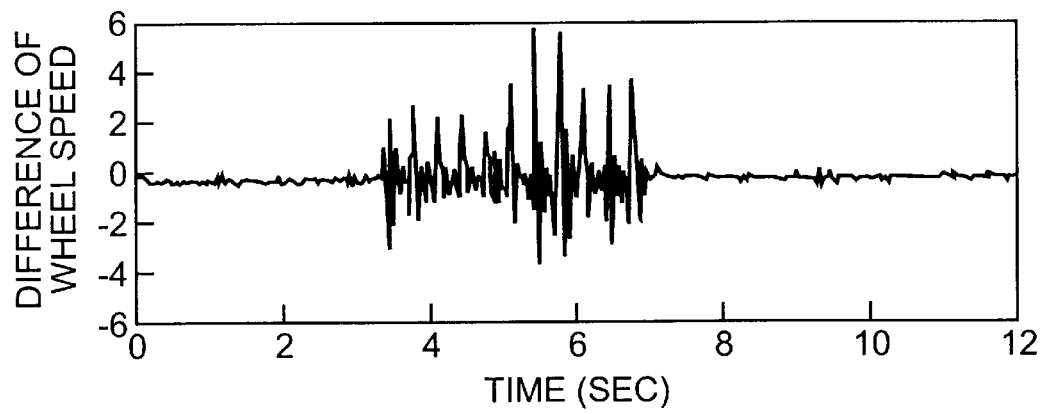
Figure 11:
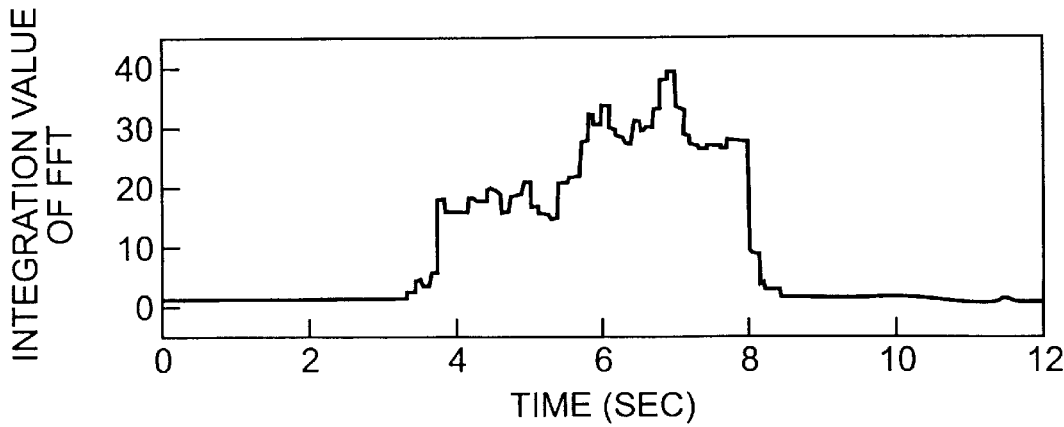
Figure 11:
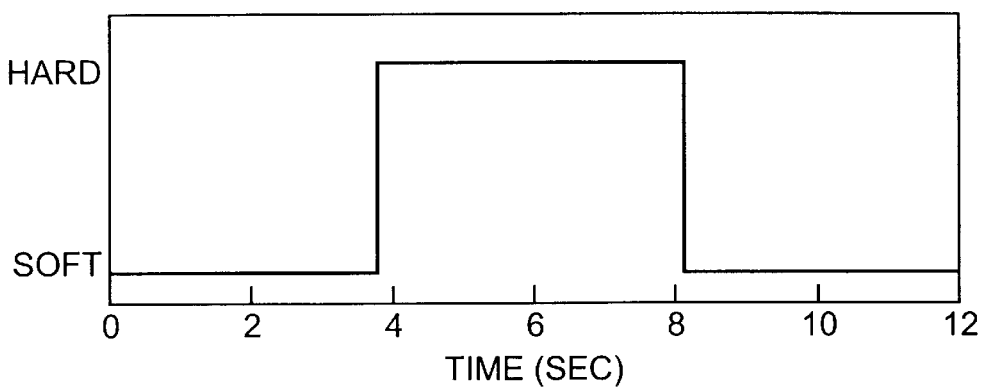
Figure 12:
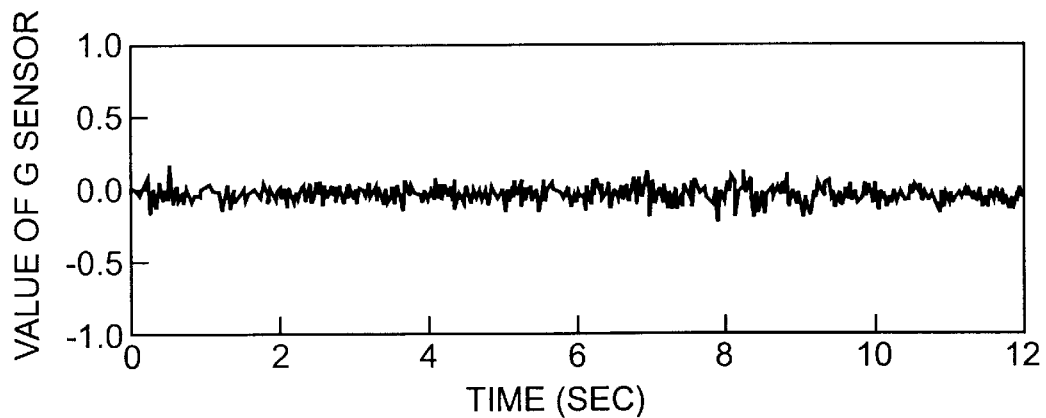
FIG. 12a–FIG. 12d are graphs which represent the results of high frequency road driving test with different condition compared with FIG. 11a–FIG. 11c.
Figure 12:
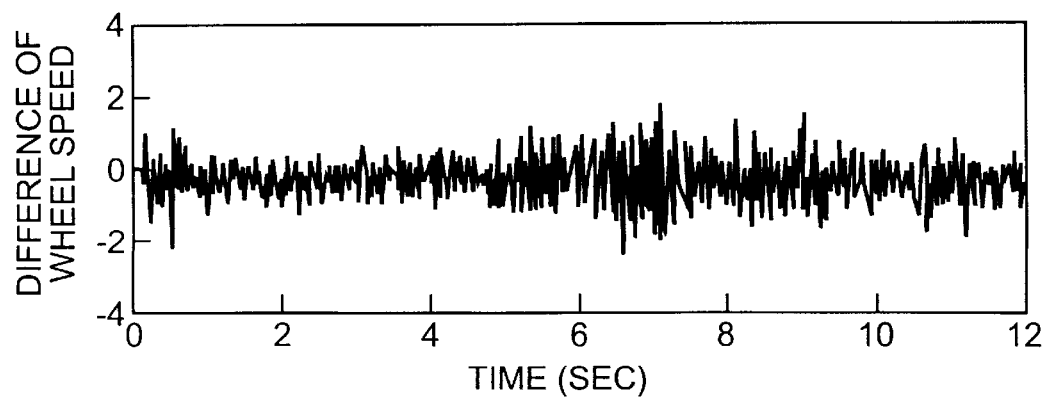
Figure 12:
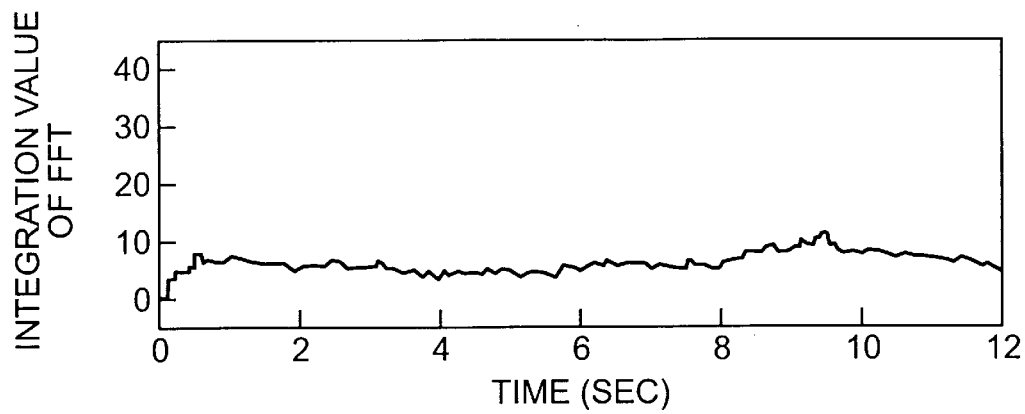
Figure 12:
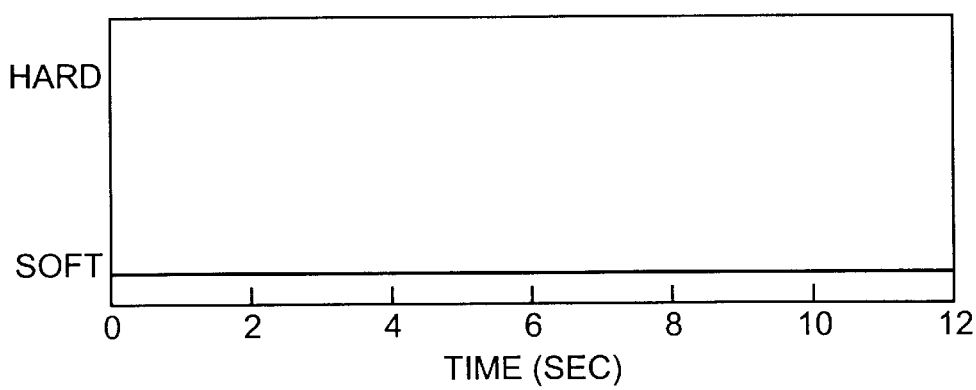

FIG. 10 is a flowchart representing the rough road detecting method. The said method (e.g., FFT or integration) is performed as follows.

Firstly, the data measured from several wheel speed sensors (36a,36b,36c & 36d) are inputted.

In the said input data, $V_{fl}$ is the front wheel sped, $V_{rl}$ is the rear left wheel speed, FbFr is the feedback value of the front actuator and FbRr is the feedback value of the rear actuator.

In case the front left wheel speed ($V_{fl}$) is below 40 KPH, about 100 data are memorized, and the said data are treated using FFT (70) for frequency value analysis.

For example, in rough road detecting, the difference of the front and rear wheel speed is calculated by measuring the period of the signals detected from the front and rear wheel speed sensors (36a,36b,36c & 36d). The said difference is treated by FFT (70) to obtain the frequency component.

Figure 9:
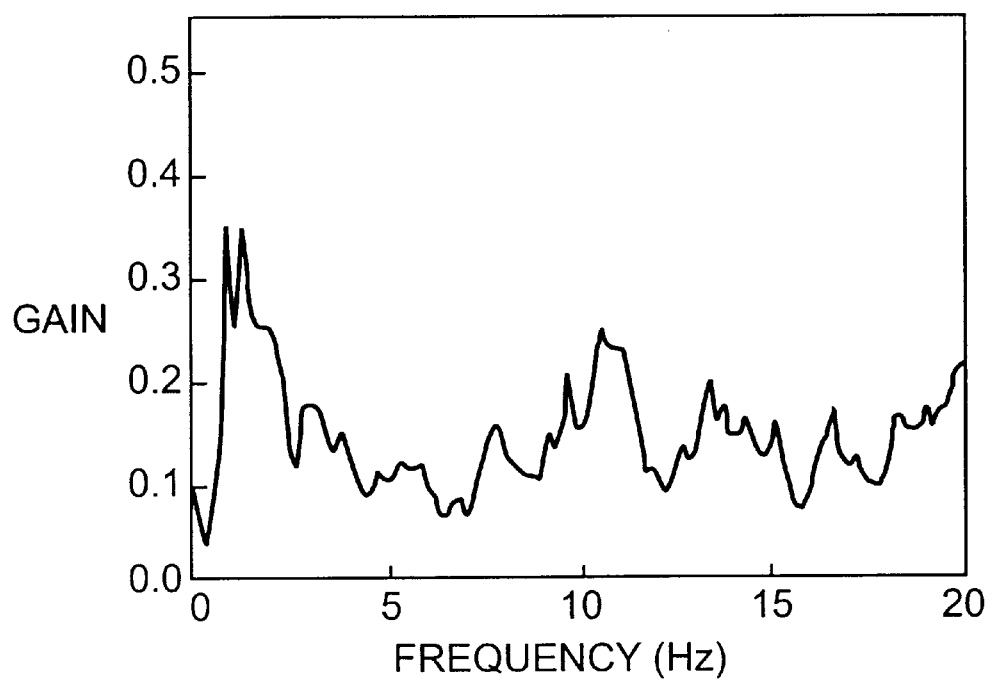
FIG. 9 is a graph which represents the relationship between the G sensor value and the frequency gain of the speed difference of the front and rear wheels.

The frequency characteristics of the G sensor (12) are inferred from multiplying the said frequency characteristics by the frequency gain, as shown in FIG. 9.

After integrating the result from 1 Hz to 8 Hz, if the frequency component integration value is greater than the threshold value, the driving road is decided as rough. Namely, $$Int = \int_1^8 D(f) \cdot H(f) df$$

It is hard if the frequency component integration value is larger than the threshold value, and soft otherwise.

In the above equation,

Int: frequency component integration value

D(f): FFT value of the wheel speed difference

H(f): frequency gain function threshold value: limiting value of the integration f: frequency (in Hz)

If the road is decided as rough, the damping force is fixed to the hard state for 3 seconds, and it is maintained until the frequency component integration value (Int) becomes smaller than the threshold-low value.

The threshold-low value was chosen as about 60% of the threshold value. The said algorithm is performed only below 30–40 KPH, like the common ECS algorithms.

As shown in FIG. 8 and FIG. 10, the frequency gain is multiplied and integrated after FFT, and it is determined whether the frequency component integration value is larger than the threshold value or not.

If the said frequency component integration value is larger than the threshold value, the damper becomes hard, and the front actuator feedback value (FbFr) is determined whether hard or not.

Though it does not need regulation if the said front actuator feedback value is hard, otherwise the damper actuator is actuated to make it equal to or harder, and maintain it in hard state for 3 seconds.

If the said frequency component integration value is below the threshold value, the damper is determined whether hard or not.

If the damper is hard, it is determined whether the frequency component integration value (Int) is larger than the threshold-low value (threshold value$^x$ 0.6).

If it is larger the damper is hard, and otherwise the damper is soft.

If the said damper is soft, it is determined whether the front actuator feedback value (FbFr) is soft. If it is soft no regulation is necessary, but otherwise, the damper actuator is actuated to make it equal or softer, and the state is maintained for about 3 seconds.

FIG. 11a–FIG. 11d are the real vehicle test results of rough road detecting. It shows the acceleration, the difference of wheel speed and the frequency component integration value when a vehicle encounters a rough road after driving a flat road.

The integration value increases due to the wheel speed difference, and when it reaches the limiting value the damping force is regulated to hard.

FIG. 12a–FIG. 12d are another test results for the road surface with excitation over 10 Hz.

The wheel speed difference is as large as that of FIG. 11a–FIG. 11d.

Figure 13:
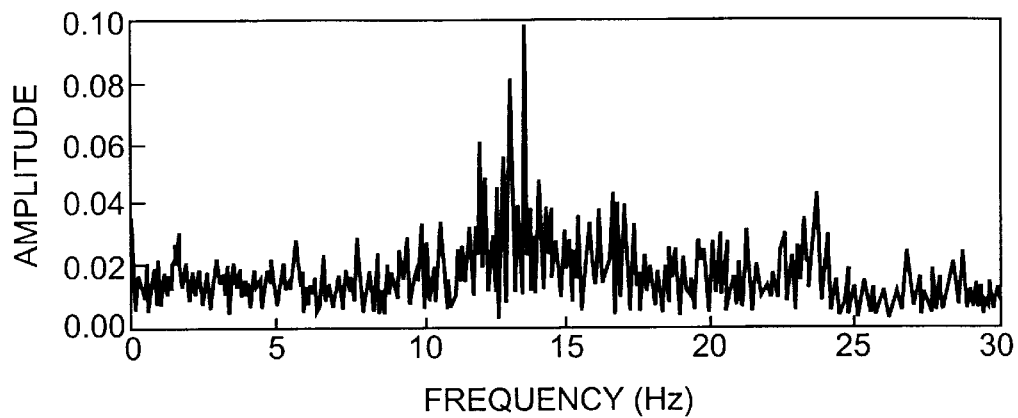
FIG. 13a and FIG. 13b are graphs which represent the G sensor and FFT results of the speed difference of the front and rear wheels in high frequency road running.
Figure 13:
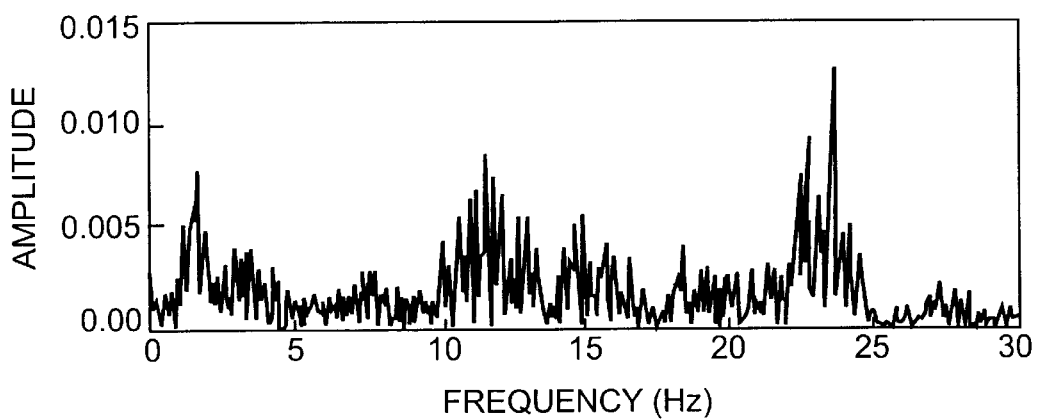

However, as shown in the FFT result of the FIG. 13a and FIG. 13b, a soft damping force contributes to improvement of ride comfort because the excitation of the said road surface is over 10 Hz.

Accordingly, this component is removed when multiplied by the frequency gain H(f) and integrated, and the actual integration value does not reach the threshold value. Therefore, it is not decided as the rough road.

Figure 14:
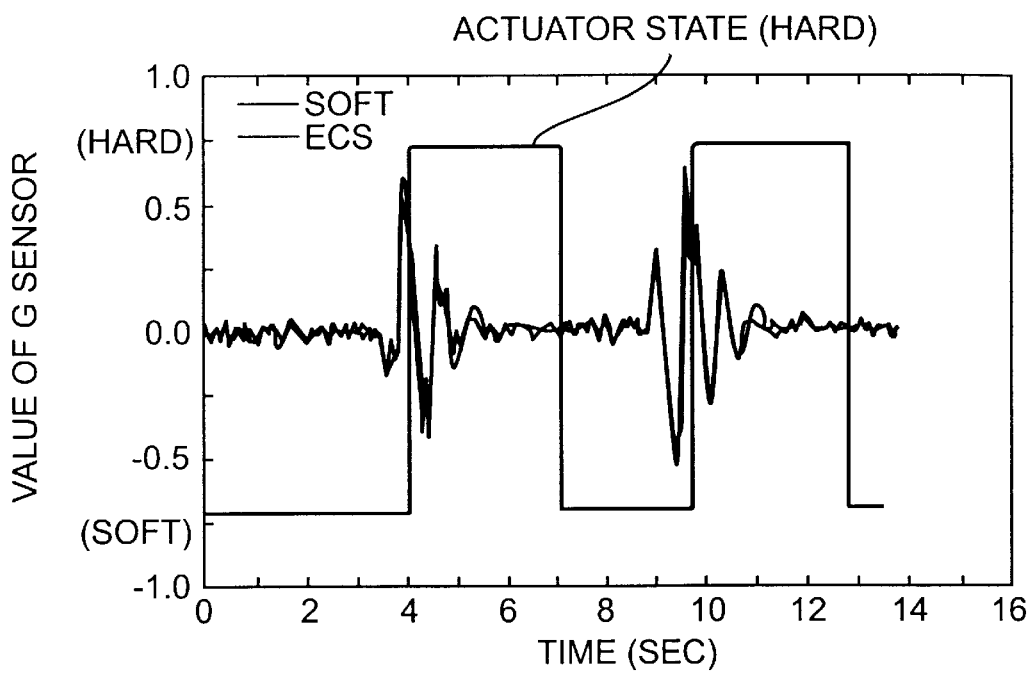
FIG. 14 is a graph which represents the control results of bump passing.

FIG. 14 shows the test result of controlling with the said algorithm and keeping the damping force soft when passing over the bump.

As shown in FIG. 14, the oscillation reduces after passing over the bump when controlled.

The filter designing using the frequency characteristics in the ECS system using wheel speed is explained in detail as follows.

The filter capable of obtaining the G sensor (12) value directly from the wheel speed data by obtaining the frequency gain H(f) of the G sensor value and the difference of wheel speed can be designed.

Namely, H(f) can be considered as a transfer function whose input is the difference of the front and rear wheel speed, and whose output is the G sensor value. Therefore if the filter with the frequency characteristics H(f) is calculated, the G sensor value can be inferred directly by inputting the wheel speed difference.

The filter coefficient is obtained using the Matlab's yule-walk function, in which the filter order was chosen as 64. The result is given below.

$$F(z) = \frac{\sum_{n=0}^{64} b_n \cdot z^{-n}}{\sum_{n=0}^{64} a_n \cdot z^{-n}}$$

, wherein
a=[1, −2.0731, 4.61315, −8.22452, 13.17125, −20.02823, 28.18874, 038.01237, 48.9055, −61.06212, 73.55558, −86.62979, 99.47787, −111,98723, 123.92025, −134.71258, 144.64789, −152.98096, 160.1568, −165.67856, 169.69245, −172,14671, 173.00396, −172.37899, 170,26704, −166.82676, 162.10351, −156.27267, 149.48814, −141, 97504, 133.80417, −125.35099, 116.70296, −108.04382, 99.63115, −91,43019, 83.67013, −76.39202, 69.51506, −63.1810, 57.21035, −51.72323, 46.61427, −41.8788, 37.41327, −33,28431, 29.41864, −25.73826, 22.36038, −19.05836, 16.06182, −13.25031, 10.67277, −8.40874, 6.4233, −4.74033, 3.36052, −2.27756, 1.46307, −0.89158, 0.48925, −0.22021, 0.08545, −0.02618, 0.01121]
b=[0.13074 ,0.22306 ,0.42298 ,0.67009 ,0.9748 ,01.37274 ,1.7908 −2.26554 ,2.756 43 −0.28856 ,3.80438 ,−4.33151 ,4.81908 ,−5.29365 ,5.72396 ,−6.09387 ,6.42243 ,−6.670 84 ,6.87151 ,−7.00236 ,7.06389 ,−70568 ,6.98947 ,−6.8638 ,6.68068 ,−6,44721 ,6.1 65307 ,−5.83661 ,5.48657 ,−5.11672 ,4.72283 ,−4.33916 ,3.94794 ,−3.57996 ,3.21616 ,−2.8678 ,2.54793 ,−2.24877 ,1.96611 ,−1.71215 ,1.46606 ,−1.26147 ,1.06956 ,−0.9 007 ,0.7356 ,−0.602 ,0.47686 ,−0.36795 ,0.26948 ,−0,18144 ,0.10877 ,−0.05 612 ,0.01335 ,0.01807 ,−002656 ,0.0427 ,0.03767, 0.03482 ,−0.03029 ,0.01915 ,−0.015451 ,0.01016 ,−0.00606 ,7.93598E-4 ,6.03303E-4]

Figure 15:
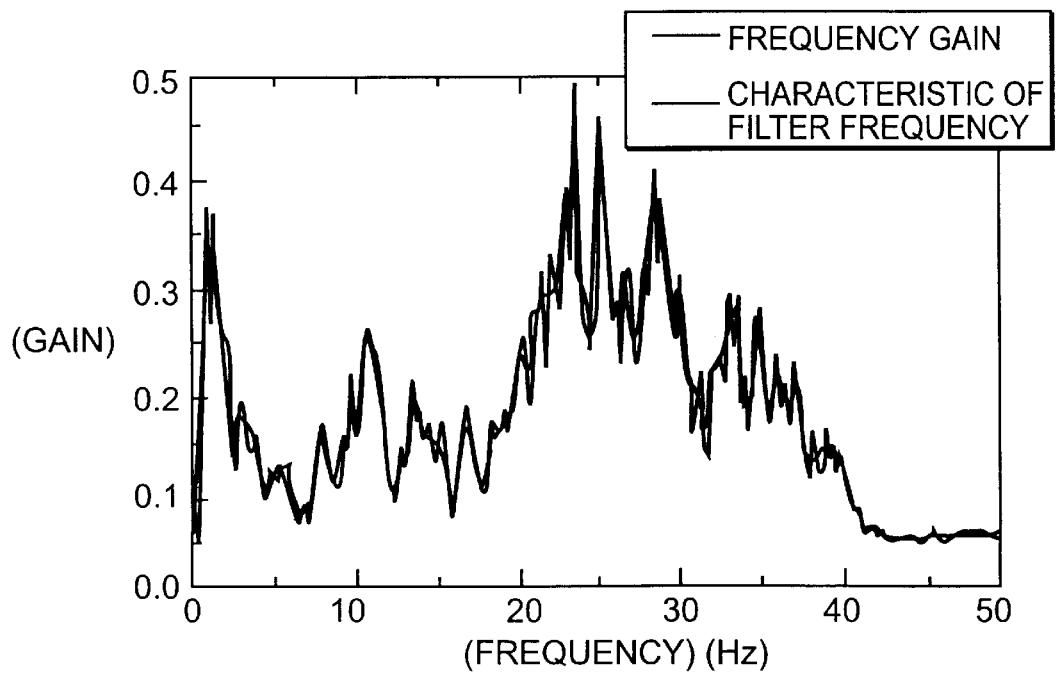
FIG. 15 is a graph which represents the frequency characteristics of the digital filter.
Figure 16:
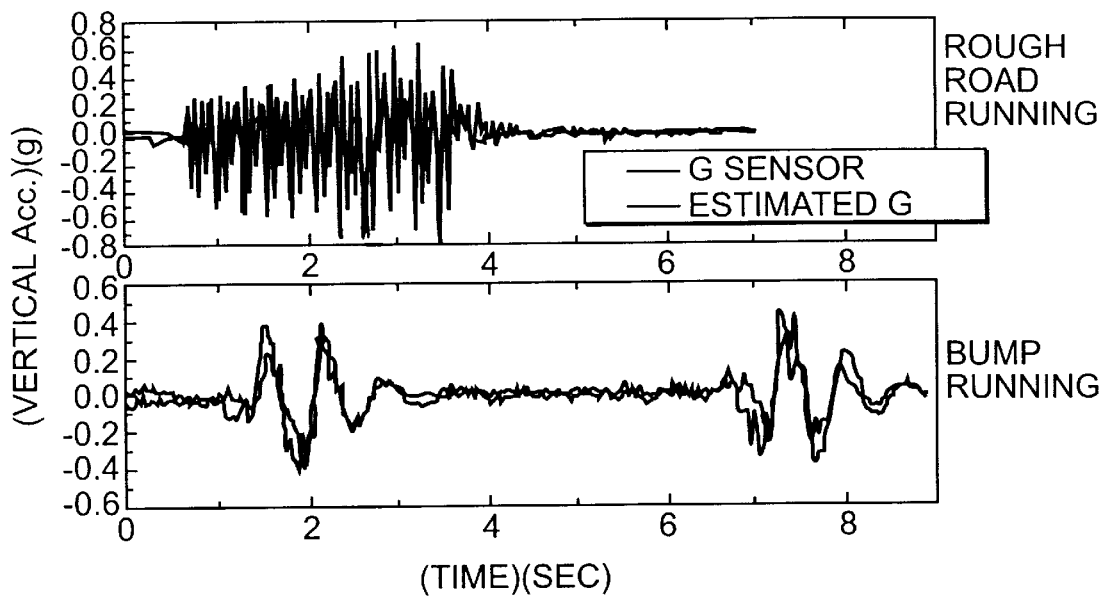
FIG. 16 is a graph which compares the actual G sensor value with the predicted G value for rough road running and bump running.

FIG. 15 shows the frequency gain due to the difference of the G sensor value and the front and rear wheel speed, and the frequency characteristics of the said filter obtained from the real vehicle test. FIG. 16 is a graph which compares the measured G sensor value with the inferred G sensor value using the filter to the wheel speed when passing over the bump and the rough road.

By substituting the above inferred G sensor value to the rough road detecting algorithm using the original G sensor, it is possible to use without a significant error.

The said method is advantageous in that the calculation amount is smaller than the said FFT using method and the G sensor value is inferred directly, but relatively, the accuracy decreases a little.

In case of turning of a vehicle, a transverse acceleration occurs in the chassis, and thereby a rolling occurs. Due to the rolling, the center of mass of the chassis moves and the stability worsens.

To solve the said problem, the ECS system performs the anti-roll control.

In the conventional ECS system, the anti-roll control has been performed by using the steering wheel sensor or transverse G sensor. Namely, the rolling is determined by using the wheel speed data and steering angular velocity or transverse G sensor value.

In the determination of rolling, the damping force is controlled high, and the rolling angle is minimized by injecting air for the air spring.

The said rolling determination can be performed with the wheel speed data.

Namely, taking advantage of fact that the turning radii of the inner wheel and the outer wheel are different, the transverse acceleration in turning can be inferred from the left and right wheel speed difference, and using the anti-roll control can be performed by using this transverse acceleration.

Figure 17:
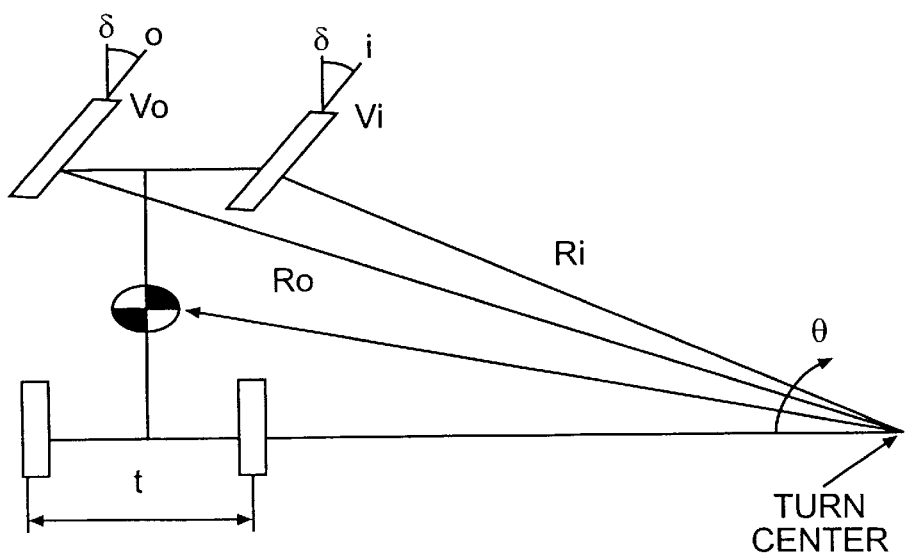
FIG. 17 is a drawing which represents the geometry of a turning vehicle.

FIG. 17 shows the geometry of turning vehicle. In FIG. 17, the radii of the inner and outer wheels become different, and the equation for calculating the transverse acceleration is obtained using this difference.

$$V_i = R_i \cdot \theta \Rightarrow \theta = \frac{V_o}{R_0} = \frac{V_i}{R_i}$$

$$V_o = R_0 \cdot \theta$$

$$R_0 - R_1 \cong t = \frac{V_o - V_i}{\theta} \Rightarrow \theta = \frac{V_o - V_i}{t}$$

, wherein
$V_i$: inner wheel speed
$V_o$: outer wheel speed
$\theta$: turning angular velocity
$R_1$: turning radius of the inner wheel
$R_o$: turning radius of the outer wheel
As $V_o = \gamma \cdot \omega_o$ and $V_i = \gamma_i$ ($\gamma$: tire radius, $\omega$: wheel angular velocity), $$R_0 = \frac{V_o \cdot t}{V_o - V_i} = \frac{\omega_o}{\omega_o - \omega_i} \cdot t$$

$$R_i = \frac{V_i \cdot t}{V_o - V_i} = \frac{\omega_i}{\omega_o - \omega_i} \cdot t$$

As the transverse acceleration $\alpha_y = V^2/R$, assuming that $R \approx R_i$, $$\alpha_y = \left(\frac{V_o - V_i}{V_i \cdot t}\right) \cdot V_i^2 = C \cdot (\omega_o - \omega_i) \cdot \omega_i$$

In the above equation, C is a constant, which is more accurate to adjust using the actual test result rather than substituting geometric values.

Namely, the constant C is calculated with the least square method using the real vehicle test as follows.

As $\alpha_y = C \cdot (\omega_o - \omega_i)\omega_i$, assuming that the constant C with the least square error of the transverse acceleration is x, $$A \cdot x = b$$

$$A = \begin{bmatrix} (\omega_o(0) - \omega_i(0)) \cdot \omega_i(0) \\ (\omega_o(1) - \omega_i(1)) \cdot \omega_i(1) \\ \vdots \\ (\omega_o(n) - \omega_i(n)) \cdot \omega_i(n) \end{bmatrix}$$

$$b = \begin{bmatrix} g(0) \\ g(1) \\ \vdots \\ g(n) \end{bmatrix}$$

, wherein
$\omega_o(n)$: outer wheel speed test data
$\omega_i(n)$: inner wheel speed test data
g(n): transverse acceleration measurement (←acceleration sensor)

$$x = \text{inv}(A^T \cdot A) \cdot A \cdot b$$

Accordingly, the constant C can be adjusted to the test result and the value can be calculated with the least square method for the two cases of left and right turn. For the two cases, the least square method results showed the C values of 0.006487 for left turn and 0.0057 for right turn respectively.

FIG. 18 is a block diagram which shows the approaching method to calculate the transverse acceleration by using the least square method.

FIG. 19 is a graph which shows the comparison of the results between the transverse acceleration value measured with an accelerometer and the transverse acceleration value calculated by the said method using wheel speed when turning the steering about 120° at 40 KPH.

Figure 20:
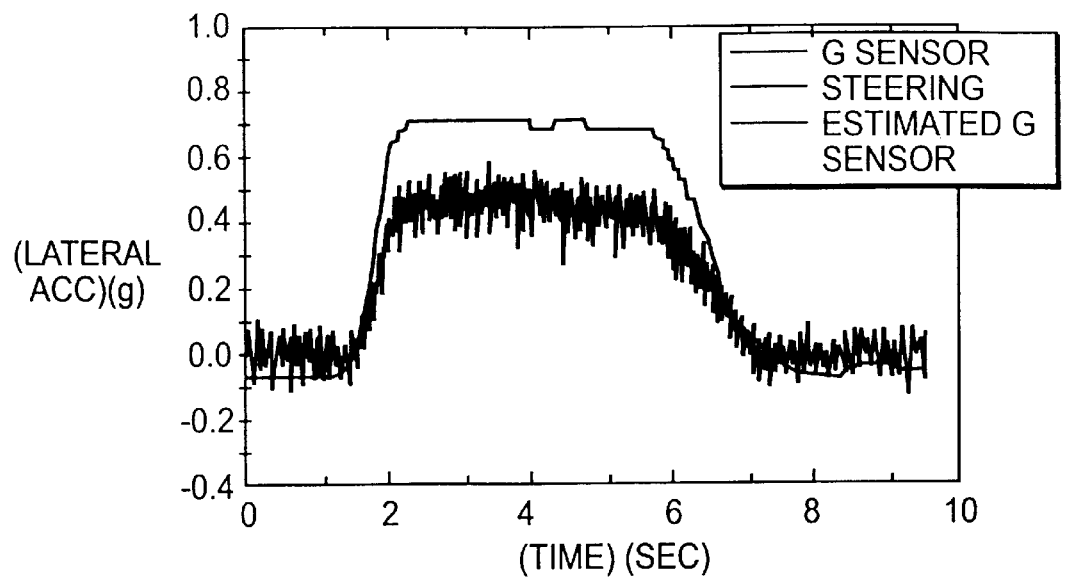
FIG. 20 is a graph which represents the calculation results of the transverse acceleration for left turning.
Figure 21:
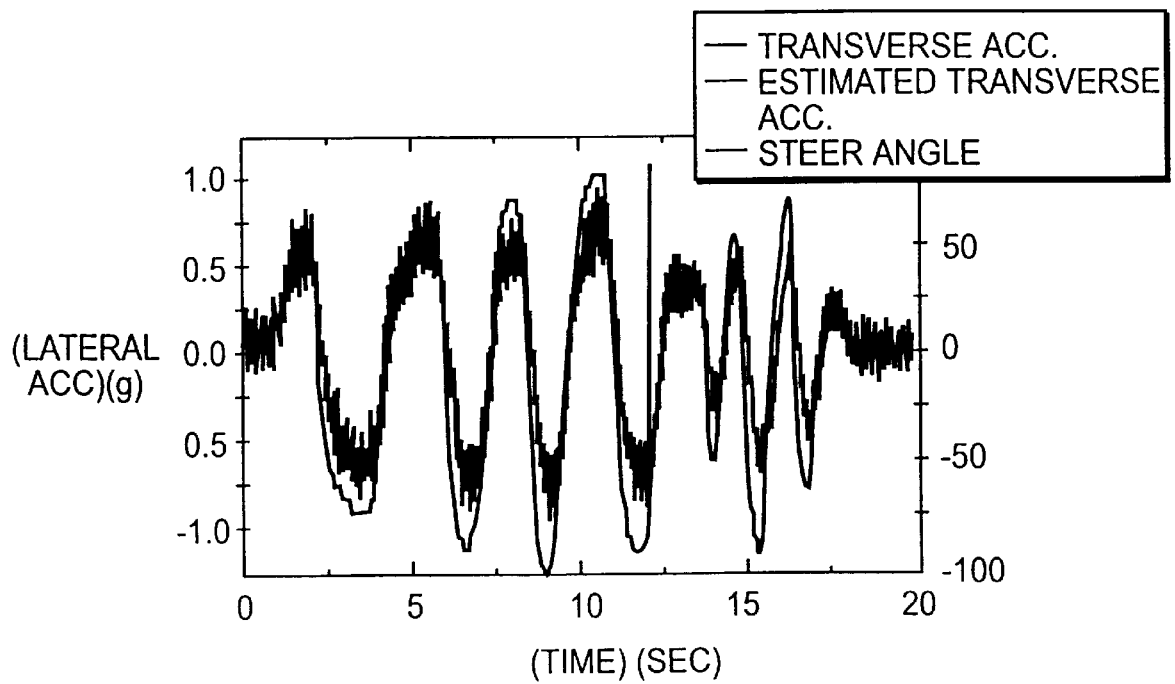
FIG. 21 is a graph which represents the calculation results of the transverse acceleration for left and right turning.
Figure 22:
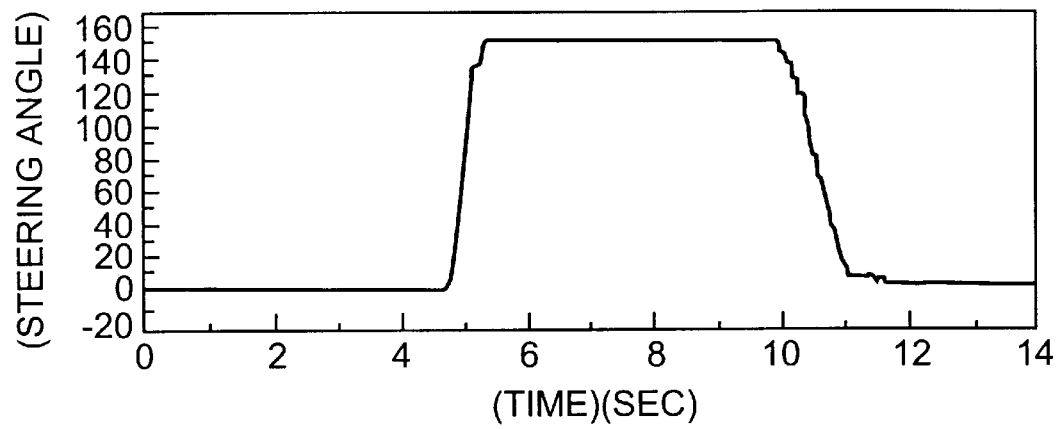
FIG. 22a–FIG. 22d are graphs which represent the calculation results of the transverse acceleration and their differentiation values for step steering.
Figure 22:
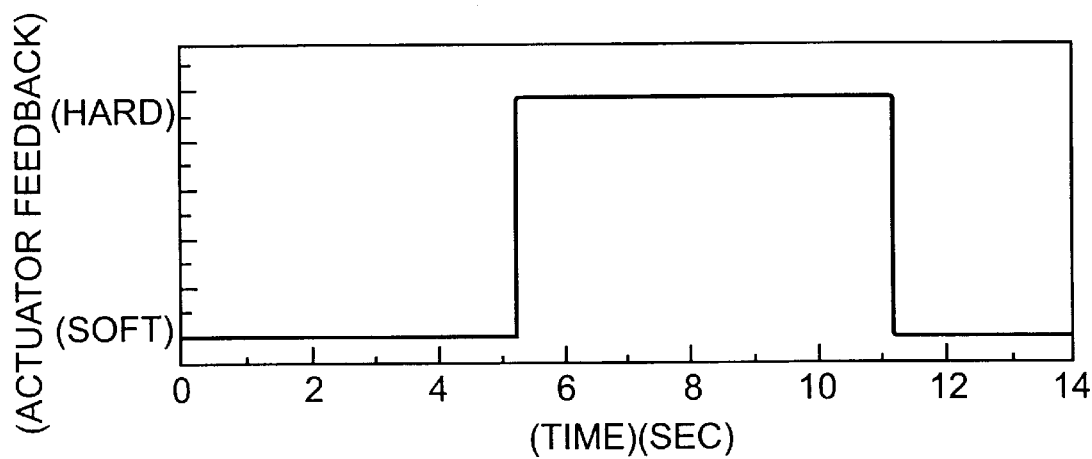
Figure 22:
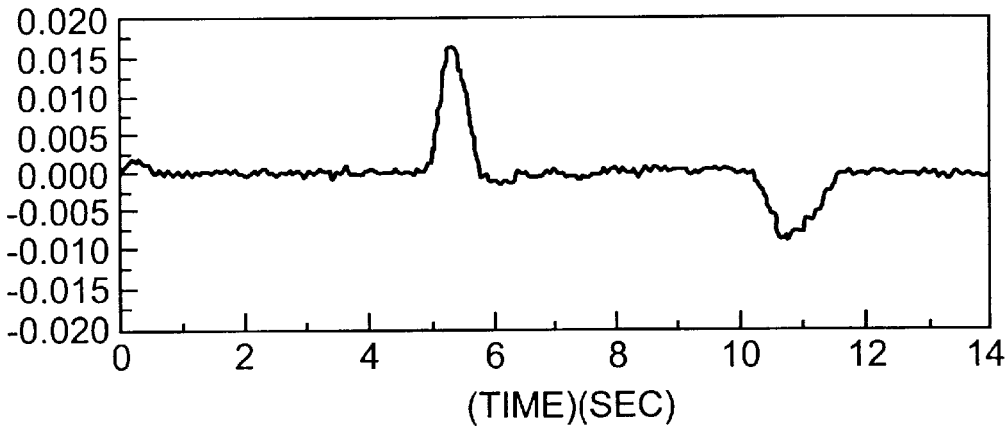
Figure 22:
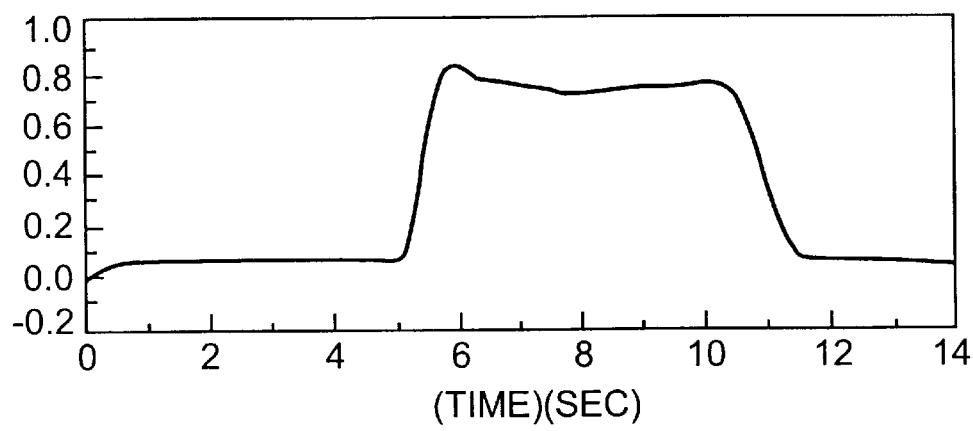

FIG. 20 is a graph with a different direction in the condition of FIG. 19, and FIG. 21 is a graph which compares the transverse acceleration when driving with shaking the steering left and right at the vehicle speed of 80 KPH.

As shown in FIG. 19–FIG. 21, the calculation of the transverse acceleration is fairly accurate and the discrepancies due to the number of riders, etc. shall be improved.

The control at the anti-roll detecting part (44) uses the transverse acceleration value obtained by using the left and right wheel speed difference at the turning of a vehicle. The anti-roll control algorithm calculates the transverse acceleration, numerically differentiate the transverse acceleration, and changes the damping force to hard if the differentiation value is lower than the transverse differentiation threshold value. As there occurs much noise in the numerical differentiation of the transverse acceleration value, the low pass filtering using the following digital filter is performed.

$$DGef[n]=-a(2)*DGef[n-1]-a(3)*DGef[n-2]+b(1)*DGe[n]+b(2)*Dge[n-1]+b(3)*Dge[n-2];$$

, wherein

DGef: differentiation value of the transverse acceleration filtered

DGe: numerical differentiation value of the transverse acceleration a(2)=−1.9112
a(3)=0.915
b(1)=0.0009
b(2)=0.0019
b(3)=0.0009

The above algorithm operates only when the vehicle speed is over 40 KPH, and once the transverse acceleration differentiation value is set as hard because it becomes larger than the transverse acceleration differentiation threshold value, it is maintained for at least 3 seconds and does not change to the soft mode until it becomes smaller than 0.2 g.

FIG. 22a–FIG. 22d show the transverse acceleration and the transverse acceleration differentiation values in step steering.

Figure 23:
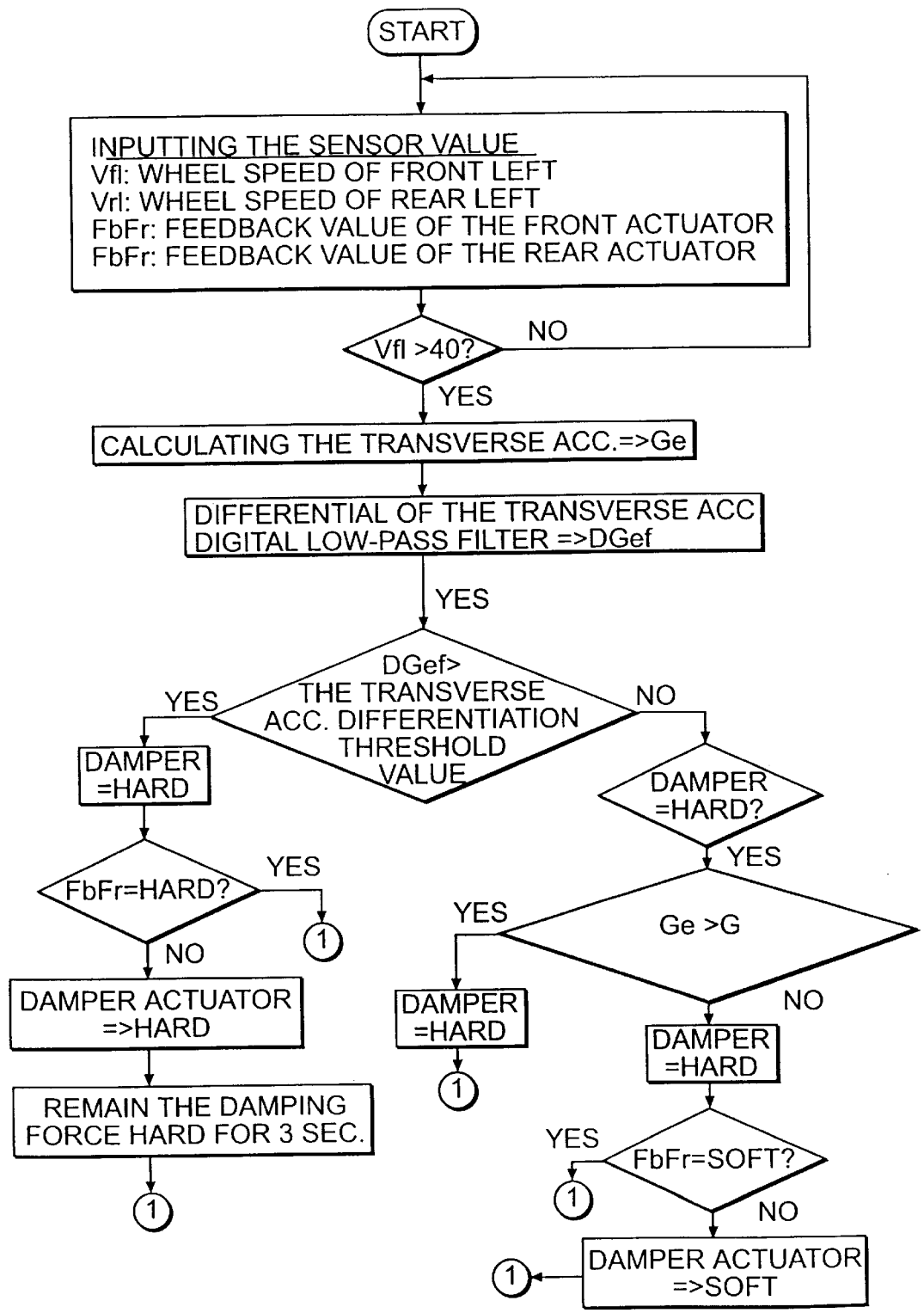
FIG. 23 is a flowchart which represents the anti-roll control algorithm.

The said anti-roll algorithm will be explained in detail referring to FIG. 23.

Firstly, the data obtained from several wheel speed sensors (36a,36b,36c & 36d) are inputted. In the data, $V_{fl}$ is the front left wheel speed, $V_{rl}$ is the rear left wheel speed, FbFr is the front actuator feedback value and FbRr is the rear actuator feedback value.

If the front left wheel speed ($V_{fl}$) is larger than 40 KPH, the transverse acceleration is calculated using $V_{fl}$ and $v_{rl}$ and the transverse acceleration is numerically differentiated.

If the filtered transverse acceleration differentiation value (DGef) is larger than the transverse acceleration differentiation threshold value the damper becomes hard, and it is determined whether the front actuator feedback value (FbFr) is hard or not.

If the front actuator feedback value is hard no regulation is necessary, however otherwise, the damper actuator is actuated to make it equal to or larger than hard, and maintained as hard for 3 seconds.

On the other hand, if the filtered transverse acceleration differentiation value (DGef) is larger than the transverse acceleration differentiation threshold value, the damper is determined whether hard or not.

If the damper is hard, it is determined whether the transverse acceleration value (Ge) is larger than the transverse acceleration threshold value (G) or not.

In case it is larger the damper becomes hard, and otherwise it becomes soft.

If the said damper is soft, the front actuator feedback value is determined whether soft or not. If it is soft, no regulation is necessary, but otherwise the damper actuator is actuated to make it soft.

In this way the ECS system using wheel speed of the present invention performs the anti-roll control of the ECS using the differentiation value of the transverse acceleration value.

Accordingly, the said ECS system using wheel speed provides the advantage of performing rough road detecting and roll control function without the G sensor and the steering angle sensor used in the conventional ECS system, performing ECS function, and enabling the self manufacture of the ECS by the use of the ECS control algorithm.

In addition, as the ECS system of the present invention excludes the conventional G sensor and steering angle sensor, the structure becomes simple and also the cost is lowered.

If the said damper is soft, the front actuator feedback value is determined whether soft or not. If it is soft, no regulation is necessary, but otherwise the damper actuator is actuated to make it soft.

In this way the ECS system using wheel speed of the present invention s performs the anti-roll control of the ECS, using the differentiation value of the transverse acceleration value.

Accordingly, the said FCS system using wheel speed provides the advantage of performing rough road detecting and roll control function without the G sensor and the steering angle sensor used in the conventional ECS system, performing ECS function, and enabling the self manufacture of the ECS by the use of the ECS control algorithm.

In addition, as the ECS system of the present invention excludes the conventional G sensor and steering angle sensor, the structure becomes simple and also the cost is lowered.

What is claimed is:

1. An electronic controlled suspension system (ECS) using wheel speed capable of determining the condition of the road surface comprising:

a) a wheel speed sensor for measuring front and rear wheel speed;

b) a throttle position sensor (TPS) for sensing an open status of the throttle valve;

c) a stop lamp switch for sensing braking status;

d) an inhibitor switch for sensing positions of an automatic transmission; and e) a rough road detecting algorithm wherein data obtained from each above recited element a) to d) are inputted to a control unit, and a rough road detecting device of the said control unit decides the condition of the road surface by performing Fourier Frequency Transforms (FFT) of the inputted data, multiplying the frequency gain, integrating and adding, wherein the said rough road detecting algorithm includes the following stages:
1) a stage wherein the predetermined wheel speed sensor value is inputted and the front left wheel speed ($V_H$) is determined whether larger than an established value or not;
2) a stage wherein FFT is performed;
3) a stage wherein the frequency gain is multiplied and the frequency component integration value is determined whether larger than a threshold value or not;
4) a stage wherein if the said frequency component integration value is larger than the threshold value the damper becomes hard, and the front actuator feedback value is determined whether hard or not;
5) a stage wherein if the said front actuator feedback value is hard no regulation is performed, and otherwise the damper actuator is actuated to make it equal to or larger than hard and maintained as hard for 3 seconds;
6) a stage wherein if the said frequency component integration value is smaller than the threshold value the damper is determined whether hard or not, and if it is hard the frequency component integration value is determined whether larger than the threshold-low value;
7) a stage wherein if the said frequency component integration value is larger than the threshold-low value the damper becomes hard, and otherwise the damper becomes soft;
8) a stage wherein if the said damper is soft the front actuator feedback value is determined whether soft or not; and
9) a stage wherein if the said front actuator feedback value is soft the damper actuator is actuated to make it equal to or larger than soft and maintained as soft for 3 seconds.

2. An ECS control system using wheel speed as defined in claim 1, wherein at the stage of comparing the frequency component integration value with the threshold value, the frequency component integration value is obtained by the following equation:

$$Int = \int_1^8 D(f) \cdot H(f) df$$

, wherein
Int: frequency component integration value
D(f): FFT value of the wheel speed difference
H(f): frequency gain function
threshold value: limiting value of the integration
f: frequency (in Hz).

3. An electronic controlled suspension system (ECS) using wheel speed capable of controlling the rolling of a vehicle comprising:
a) a wheel speed sensor for measuring front and rear wheel speed;
b) a throttle position sensor (TPS) for sensing an open status of the throttle valve;
c) a stop lamp switch for sensing braking status;
d) an inhibitor switch for sensing positions of an automatic transmission; and
e) an anti-roll control algorithm wherein the data obtained from each said element are inputted to the control unit, in which transverse acceleration is calculated using the left and right wheel speed difference, the calculated transverse acceleration is numerically differentiated, and the damping force becomes hard if the transverse acceleration differentiation value is larger than the transverse acceleration differentiation threshold value, wherein the said anti-roll control algorithm includes the following stages:
1) a stage wherein the predetermined wheel speed sensor value is inputted and front left wheel speed ($V_H$) is determined whether larger than 40 KPH or not;
2) a stage wherein transverse acceleration is calculated;
3) a stage wherein the said transverse acceleration is numerically differentiated and passed through a digital low-pass filter;
4) a stage wherein if a filtered transverse acceleration differentiation value is larger than a transverse acceleration differentiation threshold value the damper becomes hard, and front actuator feedback value is determined whether hard or not;
5) a stage wherein if the said front actuator feedback value is hard no regulation is performed, and otherwise a damper actuator is actuated to make it equal to or larger than hard and maintained as hard for 3 seconds;
6) a stage wherein if the filtered transverse acceleration differentiation value is smaller than the transverse acceleration differentiation threshold value, the damper is sensed to determine whether the condition thereof is hard or not, and if it is hard a transverse acceleration calculation value (Ge) is determined whether larger than a transverse acceleration threshold value (G);
7) a stage wherein if the said transverse acceleration calculation value (Ge) is larger than the transverse acceleration threshold value (G) the damper condition becomes hard, and otherwise the damper condition becomes soft;
8) a stage wherein if the said damper condition is soft the front actuator feedback value is determined whether soft or not; and
9) a stage wherein if the said front actuator feedback value is soft the damper actuator is actuated to make it equal to or larger than soft and maintained as soft for 3 seconds.

* * * * *